US012332431B2

(12) United States Patent
Yang (10) Patent No.: US 12,332,431 B2
(45) Date of Patent: Jun. 17, 2025

(54) COMPENSATION OF PUPIL ABERRATION OF A LENS OBJECTIVE

(71) Applicant: HEXAGON TECHNOLOGY CENTER GMBH, Heerbrugg (DE)

(72) Inventor: Zheng Yang, Friedrichshafen (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 693 days.

(21) Appl. No.: 17/542,071

(22) Filed: Dec. 3, 2021

(65) Prior Publication Data

US 2022/0179202 A1 Jun. 9, 2022

(30) Foreign Application Priority Data

Dec. 4, 2020 (EP) ..................................... 20211905

(51) Int. Cl.
*G02B 27/00* (2006.01)
*G01B 5/008* (2006.01)
*G02B 3/08* (2006.01)

(52) U.S. Cl.
CPC ......... *G02B 27/0068* (2013.01); *G01B 5/008* (2013.01); *G02B 3/08* (2013.01)

(58) Field of Classification Search
CPC ...... G02B 27/0068; G02B 3/08; G02B 13/18; G02B 27/0025; G02B 27/0012; G02B 27/0081; G01B 5/008; G01B 11/2504; G01M 11/02
USPC ....................................................... 351/205
See application file for complete search history.

(56) References Cited

U.S. PATENT DOCUMENTS

| | | | |
|---|---|---|---|
| 5,557,463 A | 9/1996 | Ueno | |
| 5,568,319 A | 10/1996 | Kaneko et al. | |
| 5,999,310 A | 12/1999 | Shafer et al. | |
| 6,480,285 B1* | 11/2002 | Hill | G02B 21/006 356/497 |
| 6,724,710 B2 | 4/2004 | Chung et al. | |
| 7,161,741 B1 | 1/2007 | Schaak | |
| 7,164,645 B2 | 1/2007 | Kimura | |
| 10,402,950 B1* | 9/2019 | Geng | G06T 7/80 |

(Continued)

FOREIGN PATENT DOCUMENTS

| | | |
|---|---|---|
| CN | 1399260 A | 2/2003 |
| CN | 1501113 A | 6/2004 |

(Continued)

OTHER PUBLICATIONS

European Search Report dated May 7, 2021 as received in application No. 20211905.3.

(Continued)

*Primary Examiner* — Wyatt A Stoffa
*Assistant Examiner* — Rahman Abdur
(74) *Attorney, Agent, or Firm* — Maschoff Brennan (57) ABSTRACT

The invention relates to a lens objective system comprising a lens objective comprising a set of optical elements, the optical properties of the optical elements induce optical aberrations of the lens objective. The system comprises an optical compensation element configured to manipulate a propagation path of light transmitting the optical compensation element, wherein the optical compensation element is configured and arranged relative to the lens objective so that the lateral offset caused by pupil aberration is reduced.

18 Claims, 3 Drawing Sheets

(56) References Cited

U.S. PATENT DOCUMENTS

| | | |
|---|---|---|
| 2002/0060958 A1 | 5/2002 | Ando et al. |
| 2007/0014028 A1 | 1/2007 | Wangler et al. |
| 2019/0104295 A1 | 4/2019 | Wendel et al. |
| 2019/0219695 A1* | 7/2019 | Kajii .................. G01C 3/08 |
| 2019/0391372 A1 | 12/2019 | Haverkamp et al. |

FOREIGN PATENT DOCUMENTS

| | | |
|---|---|---|
| DE | 10 2004 026 090 A1 | 12/2005 |
| WO | 2011/000435 A1 | 1/2011 |

OTHER PUBLICATIONS

H. Gross, "Optical Design with Zemax" Jul. 12, 2013.
CN Office Action dated Mar. 22, 2024 as received in Application No. 202111375656.8.

* cited by examiner

COMPENSATION OF PUPIL ABERRATION OF A LENS OBJECTIVE

FIELD OF THE INVENTION

The present invention relates to compensation of pupil aberrations caused by a lens objective for measuring purposes and to a related method.

BACKGROUND

It is common practice to inspect work pieces subsequent to production e.g. on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head, a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

A further advantage of using a (line) triangulation device in combination with a CMM for measuring a surface is the amount of distance information being received by one time step (one shot), i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems (e.g. articulated arm CMMs), comprising typically four segments linked together with one or two rotation axes per linkage and a total of six or seven axes, have become popular for non-repetitive measurement tasks on the shop floor. Line triangulation devices are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data is acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and to read out the image. An image of the reflected light is captured and distance information according to the contour of the detected line is derived. Based thereon, topography of the object's surface can be determined.

For measurements with high precision a respective optical metrology systems has to be calibrated. For that, there typically has to be provided a (geometrical) calibration of the cameras of such device that can guarantee for correct and accurate determination of measuring values, i.e. a position determined in an image should be assigned to a position inside a measuring volume with high precision. Therefore, a target of a calibration method is to calibrate a camera model and/or to calibrate the triangulation base of the device (in case there are at least two cameras). For example, reference coordinates at an object can be measured with the triangulation sensor and verified or corrected by use of an additional measuring system.

Such basic calibration typically is comparatively time consuming with respect to setting up a calibration arrangement and quite complex as there has to be provided exact reference coordinate information.

Alternatively, another calibration method makes use of capturing a calibration reference and image processing identified points of interest in the captured images. For that, a calibration reference is selected where certain features (e.g. centre of index marks) are known with superordinate accuracy in terms of coordinates of a 3D reference point on the calibration reference. An example of such a calibration reference is a calibration plate comprising known circles (and their centres) as reference features.

Images of the calibration reference are taken in different positions (poses) in order to cover a measurement volume of the system. Then, image points of the calibration reference points are detected in the images, in particular by means of an image-processing algorithm. Based on the identified image points, a mapping between the image points and corresponding calibrations reference points is established (e.g. also algorithmically).

In a next step, an orientation of the camera or the cameras (or the triangulation base) as well as the camera model parameters are calibrated such that a best fit through a model between image points and calibration reference points is obtained. The calibrated orientation of the camera (triangulation base) as well as the camera model parameters are stored and used for future measurements.

Optical metrology systems, such as fringe-projection based 3D stereo-scanner, photogrammetry camera, 3D laser scanner and deflectometry are non-contact optical measuring devices which are frequently used to examine the dimensional quality of produced parts in industry. For high-precision applications, these systems need to deliver an accuracy of up to 1:60000 of the FOV despite of external temperature and gravity influences. To meet the challenging requirements, an accurate and reliable calibration concept is essential.

Such calibration approach according to prior art is based on software. The use of a so-called pinhole model to describe an optics to be calibrated was found not satisfactorily to meet the accuracy requirements as such pinhole model assumes that all light rays travel through one single projection point, which is not true for used lens objectives. In consequence, later approaches apply a so-called non-pinhole model for calibration to describe the real optics in the best possible way. Known examples for applying the non-pinhole model are Kannala-Brandt generic camera model, Gennery generic camera model or Vision ray calibration model.

One drawback of the software-based approaches of above is the given complexity due to the mathematical non-linear model, the resulting higher numerical efforts and computational expense. This results in comparatively great time exposure for the calibration process. In addition, due to complexity, a probability of calibration failure is given as well. Furthermore, because of the properties of the applied approach, there is no epipolar geometry that allows for efficient stereo matching. Therefore, the complex algorithm for stereo-matching becomes even more time consuming.

SUMMARY

Aspects of the present disclosure provide an improved optical system by use of which an increased measurement accuracy is provided.

Aspects of the present disclosure provide an improved optical system that allows for efficient calibration efficiency according to the requirements the optical system is designed for.

Another aspect of the present disclosure provides an improved measuring device that provides respective efficient and precise calibration and corresponding measurement accuracy.

Above aspects are achieved by realising the features of the independent claims. Features which further develop the invention in an alternative or advantageous manner are described in the dependent patent claims.

Aspects of the present disclosure provide further improvements concerning measuring accuracy of an optical system. Common optical system are typically improved with view to image an object to be measured the best way in order to provide suitable image data to be processed. The present approach is different.

The disclosure is based on the idea to also improve the calibration process in order to result in measurement data that is improved "from the beginning". In contrast to other approaches, the present approach does not focus on creating and using a calibration model, which represents the optics to be calibrated in an improved way, i.e. more close to real optical properties and imaging characteristics than other models, but focuses on adjusting beam propagation in order to fit the used calibration model. For avoiding high complexity the calibration model of choice in context of the present disclosure is above mentioned pinhole-model or a quasi-pinhole model.

A quasi-pinhole model is to be understood to be a model that describes or represents the properties of an optical system (e.g. lens objective), wherein the optical system and/or the respective model comprises close-to pinhole characteristic, i.e. for instance pupil aberration of negligible extent.

The position of an entrance pupil varies longitudinally depending of the field angle (spherical aberration of pupil aberration of a lens objective). Pupil aberration causes a resulting 3D residual error between measured positions and nominal positions. For example, a systematic error above 60 μm can occur with a field of view (FOV) of 700 mm. This error dominantly limits the measurement accuracy.

Aspects of the disclosure use an additional optical component to correct the spherical aberration of pupil aberration of a lens objective so that an original non-pinhole characteristic of the lens objective is approached to or converted into a pinhole characteristic. By this, a pinhole-model or quasi-pinhole model can be used for calibration purposes.

Aspects of the present disclosure relate to a lens objective system comprising a lens objective and an optical compensation element. The lens objective comprises a set of optical elements, wherein each optical element defines particular optical properties, the optical properties of the optical elements induce optical aberrations of the lens objective, in particular spherical aberrations. The optical aberrations comprise at least image aberration (e.g. coma, astigmatism, distortion etc.) that causes aberration of a marginal ray of a light bundle relative to a chief ray of the light bundle, in particular regarding an image plane onto which the light bundle is projected via the lens objective, and pupil aberration. Pupil aberration causes a lateral offset of a first intersection point relative to a second intersection point along an optical axis of the lens objective. The first intersection point is defined by an intersection of the optical axis and a first chief ray having a first incident angle and the second intersection point is defined by an intersection of the optical axis and a second chief ray having a second incident angle. The first incident angle is different from the second incident angle.

An intersection of the optical axis and a first and/or second chief ray has to be understood in particular to be an intersection with respect to a geometric projection of the chief rays and the optical axis onto one common plane and an intersection of these elements in that plane.

The optical compensation element is configured to manipulate a propagation path of light transmitting the optical compensation element, wherein the optical compensation element is configured and arranged relative to the lens objective so that the lateral offset caused by pupil aberration is reduced.

This optical compensation element can be placed in front of the lens objective to be corrected. Integration of this component can be performed either directly during the design and manufacturing or by mounting it after the lens is already manufactured. For that, one can take an existing software solution to measure a non-pinhole characteristics and design a corrector to convert an off-the-shelf lens objective afterwards to obey pinhole characteristics.

In one embodiment, the optical compensation element can be configured so that an extent of reducing pupil aberration is significantly greater than an extent of reducing image aberration. The optical compensation element is embodied to manipulate the chief rays of irradiating light to intersect in one or close to one pupil position.

Moreover, the compensation element can be configures to have a small refractive power. According to an embodiment the optical compensation element can have a refraction power between −2 and +2 dioptres (dpt).

In one embodiment, the optical compensation element can provide reduction of the lateral offset caused by pupil aberration while image quality, in particular image aberration, of the lens objective remains basically unchanged.

In one embodiment, the optical compensation element can be mounted to the lens objective, in particular wherein an optical axis of the optical compensation element is coaxial or parallel with the optical axis of the lens objective.

The optical compensation element can be designed so that it has main influence or only influence on rays of pupil imaging and at most cases or completely negligible influence on rays of motive imaging. It can be manufactured and mounted with comparatively loose tolerances and therefore also with low costs.

According to a further embodiment the optical compensation element can be positioned in such way, that the virtual image of an entrance pupil of the optical compensation element is located at a distance below 20 mm to the virtual image of the entrance pupil of the lens objective.

In one embodiment, the optical compensation element can comprise at least two optical components comprising negative and/or positive menisci and at least one gap between the at least two optical components. The optical components can comprise particular and different lenses having e.g. different refraction powers and/or index. The optical components can comprise an optical spacer or safety glass.

In particular, the optical components can be arranged in specific manner in order to provide a defined manipulation of irradiating light for reduction of pupil aberration of the lens objective.

In one embodiment, an extent (width, distance) of the at least one gap is adjustable for compensation of further optical aberration effects such as coma, astigmatism, chromatic aberration and/or distortion and/or of further optical aberration effects introduced by a further optical element.

Additional aberrations introduced by an additional optical element, e.g. a 10 mm glass window, can be corrected by changing at least one gap distance. By that, a tuneable corrector can be provided which enables to adapt the optics to measurement environment without losing measurement accuracy.

In one embodiment, the width of the at least one gap is limited by limiting surfaces of the at least two optical components between which the gap is provided, wherein the limiting surfaces are parallel or concentric or comprise a relative slope difference of 5° at most.

In one embodiment, a distance between the at least two optical components is at most ⅕ (one-fifth) of the diameter of one of the optical components, and in particular at least 0.005 mm, the width of the at least one gap is defined by the distance. The above minimum distance between the at least two optical components in particular results by gluing (patching, cementing) two optical components.

According to an embodiment, the optical compensation element comprises a first end-surface and a second end-surface which is opposite to the first end-surface, the end-surfaces are parallel or concentric or comprise a relative slope difference of 5° at most. The first end-surface and a second end-surface may in particular be understood to be two surfaces limiting the extension (along the optical axis) of the compensation element.

In an embodiment, the optical compensation element can provide a total compensation Seidel coefficient of pupil aberration which has opposite sign as a total lens objective Seidel coefficient of pupil aberration of the lens objective. The total lens objective Seidel coefficient of pupil aberration of the lens objective can be defined or calculated by tracing of chief rays starting from an aperture of the lens objective towards an object plane.

By such approach, pupil aberration initially caused by the lens objective can be reduced or compensation upon combination with the optical compensation element having a total compensation Seidel coefficient of pupil aberration with opposite character (sign) compared to the total lens objective Seidel coefficient of pupil aberration.

In particular, the total lens objective Seidel coefficient of pupil aberration of the lens objective can be $SA_{pupil} = \Sigma_{k=1}^{m} S_{1\_k}$, wherein k is a surface index and m is a total number of partial surfaces and wherein $$S_{1\_k} = -A^2 h \Delta\left(\frac{u}{n}\right),$$

wherein A is a retraction invariant, h is a height of chief ray at intersection with each surface and $\Delta(u/n)$ is a change of u/n during refraction of the chief ray, wherein u is an angle between the chief ray and the optical axis and n is a refraction index.

Such approach allows to determine the Seidel coefficient of pupil aberration of a particular lens objective. For that, e.g. ray tracing is applied, wherein (only) chief rays are traced instead of marginal rays which would be traced according to the traditional Seidel approach.

In particular, the magnitude of the total lens objective Seidel coefficient can be derived by optical measurement and/or simulation, in particular ray-tracing, of the lens objective. For instance, chief rays (instead of marginal rays) can be traced starting at the aperture of the lens objective towards an object plane (instead of toward an image plane).

In one embodiment, the magnitude of the total compensation Seidel coefficient is at least 50% of the magnitude of the total lens objective Seidel coefficient. Such compensation of at least 50% of an initial pupil aberration can significantly contribute to an improvement of calibration precision, e.g. when applying a pinhole-model for performing calibration.

According to a particular embodiment, the at least one optical correction component (e.g. at least one particular optical component of the correction component) comprises
  a spherical refractive surface, or
  an aspherical refractive surface, or
  a freeform refractive surface, or
  a surface built by diffractive elements and/or refractive elements, or
  an optical metasurface.

Aspects also relate to an optical compensation element for a lens objective system according to any one of the embodiments described above. The optical compensation element is configured to be mountable on the lens objective of the lens objective system and the optical compensation element is configured and mountable relative to the lens objective so that a lateral offset between a first and second intersection point of the lens objective is reduced, wherein the lateral offset of the first intersection point relative to the second intersection point along an optical axis of the lens objective is caused by pupil aberration.

The first intersection point is defined by an intersection of the optical axis and a first chief ray having a first incident angle and the second intersection point is defined by an intersection of the optical axis and a second chief ray having a second incident angle. The first incident angle is different from the second incident angle.

The optical compensation element provides compensation of pupil aberration of a particular lens objective. In other words, the optical compensation element can be combined with an existing (common) lens objective and provides compensation of pupil aberration of the existing lens objective. The optical compensation element is designed according to optical properties of the existing lens objective, i.e. according to a pupil aberration caused by the existing lens objective. Pupil aberration of the existing lens objective can be determined by means of optical simulation of the lens system or by measuring the relative pupil positions z of the lens system in dependency of varying field angles (lateral offset).

Above approach allows to convert a non-pinhole optics (having significant pupil aberration) into a pinhole or quasi-pinhole optics (having none or close-to zero pupil aberration) by adding a respectively adjusted compensation element to an existing non-pinhole lens objective.

Aspects of the present disclosure also relate to an optical measuring device for measuring a distance and/or angle to a point of an object, with at least one lens objective and with at least one image sensor, wherein the optical measuring device provides triangulation-based optical measurements.

The optical measuring device can in particular be embodied as an industrial or geodetic surveying device or a metrology device, in particular a triangulation device or a fringe-projection 3D scanner.

The optical measuring device comprises a lens objective system according to any one of the embodiments described above. According to that, the lens objective and an optical compensation element are part of the lens objective system.

The optical measuring device is in particular applicable to triangulation-based 3D optical measuring systems, e.g. fringe-projection based 3D stereo-scanners, photogrammetry cameras, 3D laser scanners and/or deflectometry systems. Triangulation based measurements use data of at least two component, at least one which is a camera having a lens objective. The system components can include a stereo camera setup and a projector for pattern or line projections.

A triangulation-based 3D optical measuring system typically has to be calibrated such that measurements of at least one optical measuring devices can be used to derive 3D positions of object points.

Calibration can include calibrating a camera model and/or calibrating a triangulation base. Calibrating a camera model includes the definition of relevant features of a camera in terms of a model and corresponding parameters. Calibrating a triangulation base includes the definition of the relative positioning and orientation of cameras to each other as well as their position in a superordinate coordinate system.

A calibration method can include the steps of selecting a calibration reference with known coordinates of at least one 3D reference point, taking images of the calibration reference (from at least two different positions), detecting image points of the calibration reference points in the images, mapping between image points and corresponding reference points, calibrating the position and orientation of at least one camera (triangulation base) and calibrating camera model parameters such that a best fit between image points and calibration reference points is obtained.

For such calibrating a suitable camera model has to selected and applied for representing imaging properties of the camera in best possible way. Based on the approach described is becomes suitable and possible to use a pinhole or quasi-pinhole model for calibrating even an initially non-pinhole lens objective and resulting high calibration accuracy. Using a pinhole or quasi-pinhole model provides the advantage of less computing effort combined with high calibration accuracy and small error probability.

Aspects of the present disclosure relate to a method for compensating pupil aberration of a (existing or off-the shelf) lens objective. The method comprises deriving pupil aberration of the lens objective by means of determining a total lens objective Seidel coefficient of pupil aberration of the lens objective which Seidel coefficient is defined by propagation of chief rays starting from an aperture of the lens objective towards an object plane. Here, a traditional Seidel approach can be modified (as disclosed herein) in order to describe the propagation of chief rays between an (virtual) object plane and an aperture of an optical system.

After having derived the total lens objective Seidel coefficient of pupil aberration of the lens objective, an optical compensation element is designed that comprises a total compensation Seidel coefficient of pupil aberration which has opposite sign as the total lens objective Seidel coefficient of pupil aberration of the lens objective, in particular wherein the optical compensation element is configured according to any one of the embodiments described above. The optical compensation element is mounted on the lens objective. Such combination results in a compensated lens objective system.

Aspects of the present disclosure relate to a method for calibrating an optical measuring device as described herein. The method comprises performing a method for compensating pupil aberration of a lens objective as described above. By that a lens objective system with pinhole or quasi-pinhole optics is provided.

In successive steps, a calibration reference is provided, images of the calibration reference are captured with/from different poses of the optical measuring device relative to the calibration reference and image points of the calibration reference points are detected in the images by image processing.

Furthermore, a mapping between the image points and corresponding calibrations reference points of the calibration reference is established. Based on the mapping, an orientation of the optical measuring device and/or camera model parameters is calibrated by calculating a best fit between the image points and the calibration reference points using a pinhole model.

Performing the steps of above results in precisely calibrated pinhole optics, wherein the optics initially was provided as non-pinhole optics.

BRIEF DESCRIPTION OF THE DRAWINGS

The optical devices and methods according to the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
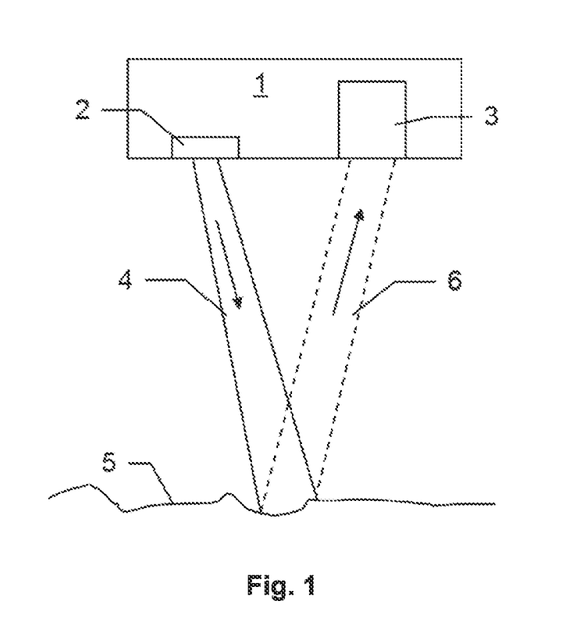
FIG. 1 shows a working principle of a triangulation device.

FIG. 1 shows the working principle of a measuring device 1 according to an example embodiment. The device 1 comprises a light emitting unit 2 and a light receiving unit 3 the relative positions and orientations of which are known. In other words, triangulation is to send out light in one known direction from a known position and to receive reflected light from a known position and measure the angle of the incoming light.

The light emitting unit 2 comprises a light source which may be represented by a laser diode for emitting laser light. Furthermore, the light emitting unit may comprise an optical unit for forming the emitted laser light so that a defined measuring beam 4 can be emitted. Preferably, such measuring beam is focused according to a first direction (vertically) and diffused with respect to a second direction (horizontally), orthogonal to the first direction. By doing so, a laser line can be produced and projected onto an object 5 to be measured. The laser line can be at least spatially partial coherent.

The light receiving or detecting unit 3 may comprise an optical assembly (e.g. lens objective) as well to form and direct the reflected light 6 to an image sensor of that unit. The sensor preferably is designed as a CCD or CMOS sensor providing a pixel-array in form of a line or an area. The sensor is also preferably tilted according to the Scheimpflug criterion so that camera's object plane coincides with the illuminated plane so that all illuminated points are imaged sharply onto the sensor. The image sensor is designed being at least sensitive for light of a wavelength of the measuring light 5. The pixels of the image sensor are exposed by the incoming reflected light 6 and a course of the line at the object 5 can be derived based on the illuminated pixels of the sensor. That allows determining distances to the object's surface based on the knowledge of the relative positions of emitter 2 and detector 3 and the detected line, in particular based additionally on the properties of the optical assembly and the position of the detected line on the image sensor.

According to an alternative embodiment not shown here, the emitted beam 4 is emitted in a direction perpendicular to the housing, allowing to place an additional receiving unit at the left side of the emitting unit 2 in order to generate additional measuring data. There also can be arranged a third receiving unit 3 placed beside the emitting unit 2 at the same distance than the first one (and/or second one) or at different distances to achieve a higher robustness against the detection of objects with a strong contrast change (introducing a shift of the detected intensity centroid) or the detection of edges causing shadowing effects.

By moving the triangulation device 1 over the object 5, continuously receiving the reflected light 6 and processing signals provided by the image sensor, the surface of the object 5 can be measured in its entirety. In particular, such scanning is performed by a coordinate measuring machine (either motorized or hand-held) carrying the triangulation device 1 and moving it along a desired measuring path.

According to some aspects, the detecting unit 3 and its optical system is configured to provide improved optical properties concerning compensated pupil aberration as further described below.

Figure 2:
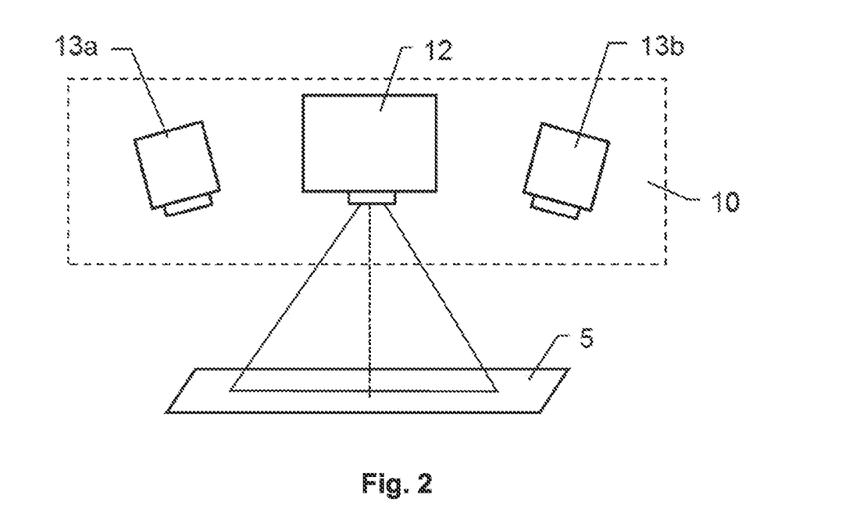
FIG. 2 shows an embodiment of a measuring device for measuring a surface of an object having a lens system.

FIG. 2 shows an embodiment of a measuring device 10 for measuring a surface of an object 5 according to an example embodiment. The device 10 comprises a projecting unit 12 and two light receiving units 13a and 13b. The projecting unit 12 and the receiving units 13a, 13b are arranged in known position and orientation relative to each other.

The projecting unit 12 defines an optical axis and a field of view within which a light or pattern projection (fringe-projection; structured light) can be directed toward the object 5. By that, a defined pattern projection can be provided on the object 5.

The cameras 13a and 13b are preferably aligned so that each camera covers a common part (in particular the entire) of the projection provided on the object 5. The two cameras 13a and 13b provide a stereo-pair. Each camera 13a and 13b comprises a lens objective for imaging the projection on an imaging sensor of the camera.

A measuring process by use of the device 10 may for instance be provided by performing the following:

An array of fringe patterns or irregular (e.g., stochastic) patterns is projected on the surface of interest, in particular by means of a digital or an analogue projector in case of regular patterns. The projected pattern creates a texture on the object 5 of interest. The two (or more) cameras 13a and 13b are controlled to take images of the object 5 with the projected patterns/fringes. The imaged textures are processed by an image processing algorithm which finds correspondences in two corresponding images of the two cameras. Corresponding points in the two images are identified and used—in conjunction with calibration data for the cameras—to calculate object points by a triangulation-based method.

To use a triangulation-based method for the computation of (reconstructed) object points, the cameras need to be calibrated e.g. according to a calibration as outlined above.

As an alternative for measuring, it should be noted that a pattern/fringe projection is particularly required if the object of interest does not possess a natural texture. Photogrammetry systems in general can also make use of physical markers that are placed on the object. In case of a digital projector it is also possible to only use one camera taking images of the projected fringe patterns on the object. However, in this case, a calibration of the projector similar to the camera calibration is required.

Each of the cameras 13a and 13b comprises a lens objective system which comprises a lens objective and an optical compensation element according to an example embodiment.

Figure 3:
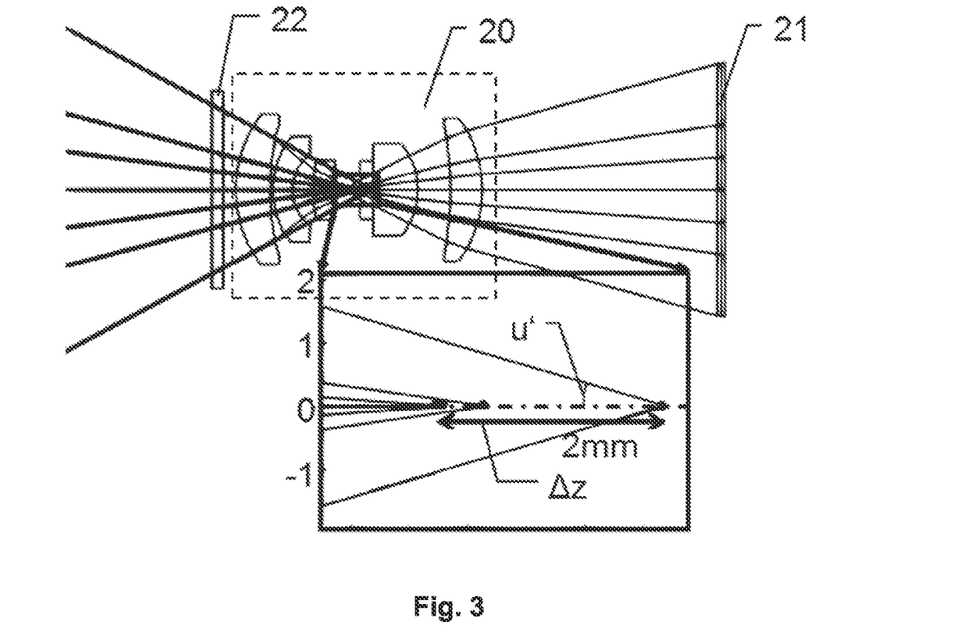
FIG. 3 shows an embodiment of a common lens objective which is part of a lens objective system.

FIG. 3 shows an embodiment of a (uncompensated) common lens objective 20 which is part of a lens objective system of the embodiment according to FIG. 1 or FIG. 2. The lens objective 20 comprises a set of optical elements, wherein each optical element provides particular optical properties. The sum of the optical properties of the optical elements result in particular imaging of light towards an image plane 21. In some embodiments, a safety glass 22 can be provided on the entrance side of the lens objective 20.

A lens objective 20 as shown here is typically designed and optimised for providing precise imaging of light beams on the image plane 21, i.e. to provide an optimised (e.g. sharp) image on the plane 21. Therefore, optical aberrations of the lens objective 20, in particular spherical aberrations, are present. However, the lens objective 20 may be optimised regarding image aberration (e.g. coma, astigmatism, distortion etc.) whereby other aberration effects remain unconsidered.

Typically, image aberration causing aberration of a marginal ray of a light bundle relative to a chief ray of the light bundle is caused by the optical elements. A marginal ray of a light bundle does typically have some aberration regarding an image plane onto which the light bundle is projected by the lens objective; in other words: a marginal ray does not follow a path which results in a position on the image plane which position has proper relation relative to the chief ray. Such error mainly influences imaging properties of the optical system in sense of providing an optimised (e.g. sharp) image on the image plane.

In addition to image aberration also pupil aberration is typically caused by optical lens objectives. Pupil aberration relates to a longitudinal variation of the entrance pupil depending of the field angle (offset of a first intersection point relative to a second intersection point along an optical axis of the lens objective). The source of this error is the spherical aberration part of pupil aberration in optics. This phenomenon can be understood as that the position of entrance pupil is not constant while field angle increases. The longitudinal traveling distance Δz (FIG. 3) of entrance pupil of increasing field angle u' is characterised by the Seidel coefficient of spherical aberration of pupil imaging $SA_{pupil}$ $$\Delta z = \frac{SA_{pupil}}{2n'u'^2},$$

wherein n' is the refraction index and u' is the numerical aperture angle at the image side.

$SA_{pupil}$ characterises pupil aberration as spherical aberration existing at imaging the physical aperture towards an object (in contrast to imaging towards the image plane). It is calculated by tracing chief rays starting from (middle of) the aperture towards the object plane, while the Seidel coefficient of classical spherical aberration for motive imaging is calculated by tracing marginal ray through all lenses from first lens surface to image plane. This phenomenon of pupil aberration limits the measurement accuracy since commonly uses calibration approaches do not sufficiently consider this effect.

In context of the present disclosure, $SA_{pupil}$ of the lens objective is also called total lens objective Seidel coefficient of pupil aberration of the lens objective.

Figure 4:
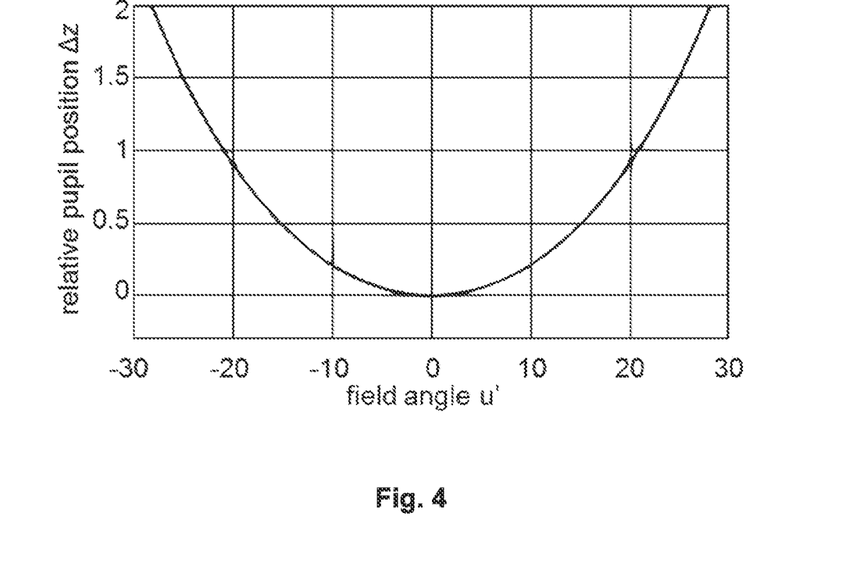
FIG. 4 shows a variation of the z-position of the lens objective's pupil of FIG. 3 over the field angle u'.

FIG. 4 shows a variation of the z-position of the lens objective's pupil of FIG. 3 over the field angle u' of irradiating light bundles (only chief rays).

Figure 5:
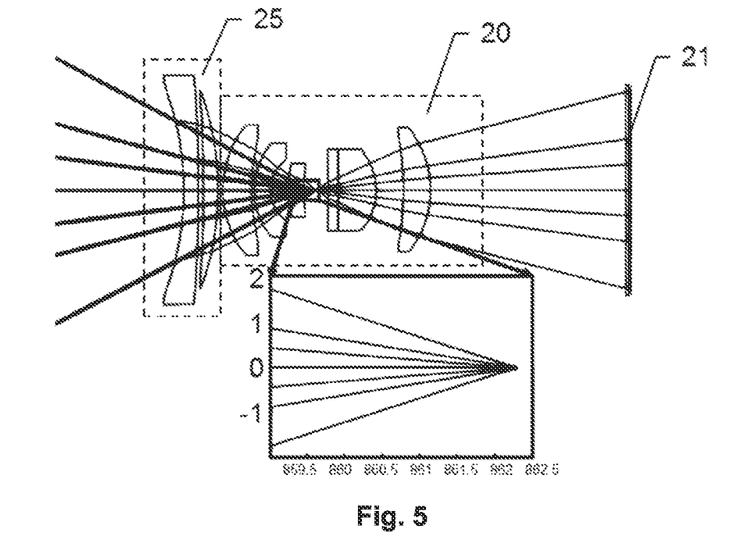
FIG. 5 shows a lens objective in combination with an optical compensation element.

FIG. 5 shows a lens objective 20 in combination with an optical compensation element 25 according to an example embodiment. A combination of a lens objective 20 and optical compensation element 25 as shown is to be understood as a lens objective system. The optical compensation element 25 is designed to manipulate propagation paths of light transmitting the optical compensation element 25. The optical compensation element 25 is specifically configured and arranged relative to the lens objective 20 so that the lateral offset Δz caused by pupil aberration of the lens objective 20 is reduced.

As can be seen from FIG. 5, the compensation element 25 provides propagation of the chief rays of light bundles irradiating with different incident angles so that the entrance pupil for different incident angles is basically identical. There is no (or only negligible small) variation of the z-position (reduced or eliminated Δz). By doing so, a non-pinhole optics is converted into a pinhole or quasi-pinhole optics.

Aspects of the present disclosure use the optical compensation element 25 to correct the spherical aberration of pupil aberration of a lens objective, so that a non-pinhole lens objective is converted to a pinhole lens objective. By this conversion, a traditional pinhole model can be used for calibration of the optics e.g. in a measuring device (FIG. 1 or 2) to achieve improved measurement accuracy without having additional numerical efforts and computational expense.

This optical compensation element 25 is placed in front of the lens objective 20 to be corrected. In front means at the light entrance side of the lens objective 20. Integration of this component 25 can be provided either directly during the design and manufacturing or by mounting it after the lens is already manufactured. For that, one can measure the non-pinhole characteristics of an existing lens objective and design a particular compensation element 25 to convert such (off-the-shelf) lens objective afterwards to obey pinhole or quasi-pinhole characteristics.

The optical compensation element 25 is designed so that this element 25 has mainly (or even only) influence on rays of pupil imaging (pupil aberration) and negligible influence on rays of motive imaging (image aberration). By that, it can be manufactured and mounted with loose tolerances and therefore also with low costs. The tolerance in particular is >100 μm for group decentre and >5' for group tilt.

The optical compensation element 25 in particular comprises weak positive or negative refraction power (between −2 and +2 dpt). The element 25 is preferably positioned in such way, that a virtual image of the entrance pupil through this element is located at the same position as the entrance pupil with certain tolerance (<20 mm).

The optical compensation element 25 is used to correct the spherical aberration part of pupil aberration of pupil imaging. The spherical aberration of this element 25 is designed to have opposite sign (and in particular same or similar magnitude) as the pupil aberration of the lens objective 20 to be corrected. In particular, the sum of the total lens objective Seidel coefficient of pupil aberration of the lens objective and of a total compensation Seidel coefficient of pupil aberration of the compensation element is close to or is zero.

An optical compensation element according to an example embodiment, in particular the optical compensation element 25 of FIG. 5, can be designed by considering a bending of a close-to-zero-power meniscus element and the Seidel coefficient SA of spherical aberration.

According to typical approaches, the Seidel coefficient of spherical aberration at k-th surface is $$S_{1-k} = -A^2 h \Delta\left(\frac{u}{n}\right),$$

where A is refraction invariant (A=in, i: angle between marginal ray and surface normal, n: the refraction index), h is the height of marginal ray at intersection with each surface, $$\Delta\left(\frac{u}{n}\right)$$

is the change of u/n during refraction of marginal ray at each surface (u: angle between marginal ray and optical axis). Above definition is applicable on spherical aberration of motive imaging.

Here, for pupil imaging (pupil aberration), chief rays have to be used (traced) for calculation of the Seidel coefficient instead of marginal rays.

The total lens objective Seidel coefficient of pupil aberration of the lens objective is $$SA_{pupil} = \Sigma_{k=1}^{m} S_{1\_k}.$$

where k is a surface index and m is a total number of partial surfaces.

In consequence, the compensation element 25 is designed to provide a specific total compensation Seidel coefficient of pupil aberration. This total compensation Seidel coefficient here is designed to have opposite sign compared to the total lens objective Seidel coefficient of pupil aberration of the lens objective (which can be calculated or measured according to the principle of above). Moreover, the magnitude of the total compensation Seidel coefficient here is close to or corresponds to the magnitude of the total lens objective Seidel coefficient.

Figure 6:
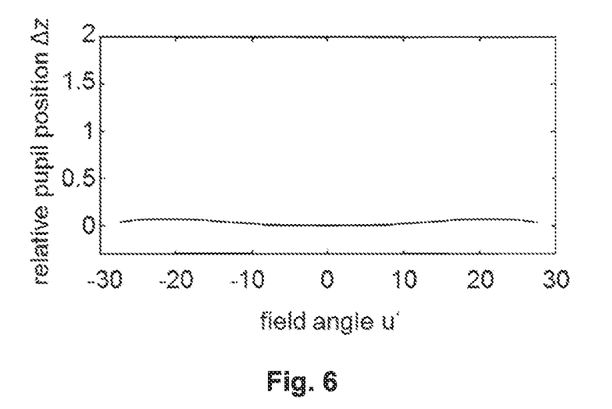
FIG. 6 shows a variation of the z-position of the lens objective's pupil over the field angle u' for a lens objective system according to FIG. 5.

FIG. 6 shows the variation of the z-position of the lens objective's pupil over the field angle u' of irradiating light bundles for a compensated lens objective system according to FIG. 5. As can be seen, the z-pupil positions resulting from different incident angles do not vary or vary only to a small extent.

FIGS. 7a-d show various embodiments of optical compensation elements 25a-25d according to an example embodiment. Each of the elements 25a-25d is configured to compensate a particular error of pupil aberration of a particular leans objective.

The design of the compensation elements may not only depend on the pupil aberration error present in a lens objective, but may also be driven by manipulating further optical effects/errors.

Figure 7A:
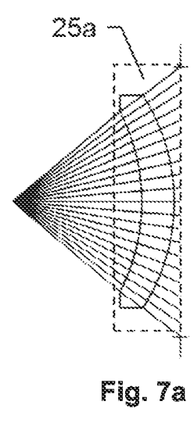
FIGS. 7a-d show various embodiments of optical compensation elements.
Figure 7B:
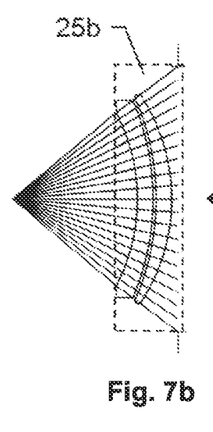
Figure 7C:
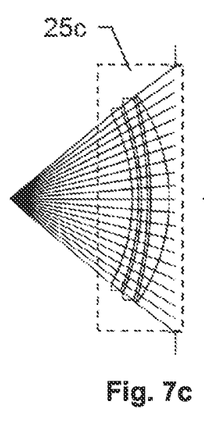
Figure 7D:
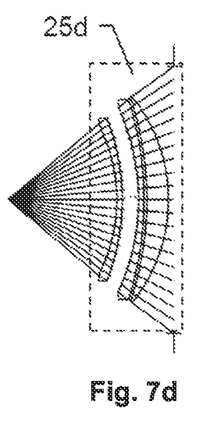

Starting from the single element like of FIG. 7a, one can further extend it to a multi-element corrector comprising of multiple negative and positive menisci as illustrated in FIGS. 7b-d. This is implemented by introducing curved and parallel (concentric) or close-to-parallel gaps.

Possible gaps in-between two successive optical elements can provide further degrees of freedom such as gap distance, gap curvature, gap parallelism, different glass materials. These degrees of freedom provide to compensate further aberrations such as coma, astigmatism, chromatic aberration and distortion by choosing and setting particular and matching gaps.

Moreover, tuning of the lens system can be provided by this component by means of changing the gap distances. Such tuning can also be advantageous for adaptation of the optics to environmental conditions during a measurement.

Furthermore, a correction magnitude can be adjusted by changing the extent of at least one air gap.

The correctors 25a-d can further be constructed with either a single low-refraction-power meniscus or a combination of several menisci with alternating refraction power sign, such as positive-negative-positive or negative-positive-negative.

The air gaps between successive/neighbouring menisci can provide parallel (or close-to-parallel) or concentric (or close-to-concentric) surfaces. Successive lens surfaces can provide very similar or identical shapes and spatial diameter. The surfaces may have a maximal slope difference of 5°.

The air gaps can in particular comprise a thickness (width) of one-fifth of a diameter of one of the optical elements at maximum.

In one embodiment, the optical compensation element may be configured so that a distance between successive optical elements is variable, in particular the distance can be adjusted in controlled manner e.g. by a motor. By that, an active compensation of aberrations introduced by further optical elements or the like can be provided.

In a particular embodiment, the first and last lens surfaces of the corrector 25a-d can be parallel or concentric relative to each other. In particular, the first and last lens surfaces may provide a maximal slope difference of 5°.

According to an embodiment, the total refraction power of a compensation element 25a-d can be between ±2 dpt (dioptre).

As mentioned above, pupil aberration of the compensation element 25a-d can be of opposite sign as the pupil aberration of the optics to be corrected. The magnitude of the pupil aberration of the compensation element 25a-d in particular is at least 50% of pupil aberration of the optics to be corrected.

The corrector 25a-d (compensation element) is preferably placed at any position between object plane and physical aperture of a lens objective.

Although the invention is illustrated above, partly with reference to some specific embodiments, it must be understood that numerous modifications and combinations of different features of the embodiments can be made and that the different features can be combined with each other or with triangulation devices and/or coordinate measuring machines known from prior art.

What is claimed is:

1. A lens objective system comprising:
a lens objective comprising a set of optical elements, wherein each optical element defines particular optical properties, the optical properties of the optical elements induce optical aberrations of the lens objective, the optical aberrations comprising at least:
image aberration causing aberration of a marginal ray of a light bundle relative to a chief ray of the light bundle, and
pupil aberration causing a lateral offset (Δz) of a first intersection point relative to a second intersection point along an optical axis of the lens objective, the first intersection point is defined by an intersection of the optical axis and a first chief ray having a first incident angle (u'), the second intersection point is defined by an intersection of the optical axis and a second chief ray having a second incident angle, the first incident angle is different from the second incident angle,
an optical compensation element configured to manipulate a propagation path of light transmitting the optical compensation element, wherein the optical compensation element is configured and arranged relative to the lens objective so that the lateral offset (Δz) caused by pupil aberration is reduced, wherein the optical compensation element is configured so that an extent of reducing pupil aberration is significantly greater than an extent of reducing image aberration, and wherein the optical compensation element provides reduction of the lateral offset (Δz) caused by pupil aberration while image aberration of the lens objective remains basically unchanged.

2. The lens objective system according to claim 1, wherein:

the optical compensation element is mounted to the lens objective, wherein an optical axis of the optical compensation element is coaxial or parallel with the optical axis of the lens objective, and/or the optical compensation element is positioned in such way, that the virtual image of an entrance pupil of the optical compensation element is located at a distance below 20 mm to the virtual image of the entrance pupil of the lens objective.

3. The lens objective system according to claim 1, wherein the optical compensation element:

has a refraction power between −2 and +2 dioptres (dpt), and/or comprises at least two optical components comprising negative and/or positive menisci, and/or comprises at least one gap between the at least two optical components.

4. The lens objective system according to claim 3, wherein:

an extent of the at least one gap is adjustable to compensate further optical aberration effects and/or further optical aberration effects introduced by a further optical element, and/or a width of the at least one gap is limited by limiting surfaces of the at least two optical components, wherein the limiting surfaces are parallel or concentric or comprise a relative slope difference of 5° at most, and/or a distance between the at least two optical components is at most one-fifth of the diameter of one of the optical components, at least 0.005 mm, the width of the at least one gap is defined by the distance.

5. The lens objective system according to claim 1, wherein the optical compensation element comprises a first end-surface and a second end-surface which is opposite to the first end-surface, the end-surfaces are parallel or concentric or comprise a relative slope difference of 5° at most.

6. The lens objective system according to claim 1, wherein the optical compensation element provides a total compensation Seidel coefficient of pupil aberration which has opposite sign as a total lens objective Seidel coefficient of pupil aberration of the lens objective, the total lens objective Seidel coefficient of pupil aberration of the lens objective is defined by propagation of chief rays starting from an aperture of the lens objective towards an object plane.

7. The lens objective system according to claim 6, wherein the total lens objective Seidel coefficient of pupil aberration of the lens objective is $SA_{pupil} = \Sigma_{k=1}^{m} S_{1\_k}$, wherein k is a surface index and m is a total number of partial surfaces and wherein $$S_{1\_k} = -A^2 h \Delta\left(\frac{u}{n}\right),$$

wherein A is a refraction invariant, h is a height of chief ray at intersection with each surface and $$\Delta\left(\frac{u}{n}\right)$$

is a change of $$\frac{u}{n}$$

during retraction of the chief ray, wherein u is an angel between the chief ray and the optical axis and n is a refraction index.

8. The lens objective system according to claim 1, wherein the magnitude of the total compensation Seidel coefficient is at least 50% of the magnitude of the total lens objective Seidel coefficient.

9. The lens objective system according to claim 1, wherein the magnitude of the total lens objective Seidel coefficient is derived by optical measurement and/or simulation of the lens objective.

10. An optical measuring device for measuring a distance and/or angle to a point of an object, with at least one lens objective and with at least one image sensor, wherein the optical measuring device provides triangulation-based optical measurements, wherein the optical measuring device comprises a lens objective system according to claim 9, wherein the lens objective and an optical compensation element are part of the lens objective system.

11. The lens objective system according to claim 1, wherein the optical compensation element is configured to be mountable on a lens objective of the lens objective system and wherein the optical compensation element is configured and mountable relative to the lens objective so that a lateral offset (Δz) of the lens objective is reduced, wherein pupil aberration causes the lateral offset (Δz) of a first intersection point relative to a second intersection point along an optical axis of the lens objective, the first intersection point is defined by an intersection of the optical axis and a first chief ray having a first incident angle, the second intersection point is defined by an intersection of the optical axis and a second chief ray having a second incident angle, the first incident angle is different from the second incident angle.

12. An optical measuring device for measuring a distance and/or angle to a point of an object, with at least one lens objective and with at least one image sensor, wherein the optical measuring device provides triangulation-based optical measurements, wherein the optical measuring device comprises a lens objective system according to claim 1, wherein the lens objective and an optical compensation element are part of the lens objective system.

13. A method for compensating pupil aberration of a lens objective, comprising:

deriving pupil aberration of the lens objective by means of determining a total lens objective Seidel coefficient of pupil aberration of the lens objective which is defined by propagation of chief rays starting from an aperture of the lens objective towards an object plane, designing an optical compensation element comprising a total compensation Seidel coefficient of pupil aberration which has opposite sign as the total lens objective Seidel coefficient of pupil aberration of the lens objective, wherein the optical compensation element is configured according to claim 1, and mounting the optical compensation element on the lens objective.

14. A method for calibrating an optical measuring device, the method comprising:
performing the method according to claim 13 to provide the lens objective system with pinhole or quasi-pinhole optics,
providing a calibration reference,
capturing images of the calibration reference with different poses of the optical measuring device relative to the calibration reference,
detecting image points of the calibration reference points in the images by image processing,
establishing a mapping between the image points and corresponding calibrations reference points of the calibration reference, and
calibrating an orientation of the optical measuring device and/or camera model parameters by calculating a best fit between the image points and the calibration reference points using a pinhole model.

15. An industrial or geodetic surveying device or metrology device for measuring a distance and/or angle to a point of an object, with at least one lens objective and with at least one image sensor, wherein the optical measuring device provides triangulation-based optical measurements, wherein the optical measuring device comprises a lens objective system according to claim 1, wherein the lens objective and an optical compensation element are part of the lens objective system.

16. A triangulation device or fringe-projection 3D scanner, for measuring a distance and/or angle to a point of an object, with at least one lens objective and with at least one image sensor, wherein the optical measuring device provides triangulation-based optical measurements, wherein the optical measuring device comprises a lens objective system according to claim 1, wherein the lens objective and an optical compensation element are part of the lens objective system.

17. A method for compensating pupil aberration of a lens objective, comprising:
deriving pupil aberration of the lens objective by means of determining a total lens objective Seidel coefficient of pupil aberration of the lens objective which is defined by propagation of chief rays starting from an aperture of the lens objective towards an object plane,
designing an optical compensation element comprising a total compensation Seidel coefficient of pupil aberration which has opposite sign as the total lens objective Seidel coefficient of pupil aberration of the lens objective, wherein the optical compensation element is configured according to claim 1, and
mounting the optical compensation element on the lens objective.

18. An optical compensation element for a lens objective system, wherein the optical compensation element is configured to be mountable on a lens objective of the lens objective system, wherein the lens objective comprises a set of optical elements, wherein each optical element defines particular optical properties, the optical properties of the optical elements induce optical aberrations of the lens objective, optionally spherical aberrations, the optical aberrations comprising at least:
an image aberration causing aberration of a marginal ray of a light bundle relative to a chief ray of the light bundle, in particular regarding an image plane onto which the light bundle is projected via the lens objective, and
a pupil aberration causing a lateral offset ($\Delta z$) of a first intersection point relative to a second intersection point along an optical axis of the lens objective, the first intersection point is defined by an intersection of the optical axis and a first chief ray having a first incident angle, the second intersection point is defined by an intersection of the optical axis and a second chief ray having a second incident angle, the first incident angle is different from the second incident angle,
and wherein the optical compensation element is configured and mountable relative to the lens objective so that the lateral offset ($\Delta z$) of the lens objective is reduced, wherein:
the optical compensation element is configured so that an extent of reducing pupil aberration is significantly greater than an extent of reducing image aberration; and
the optical compensation element provides reduction of the lateral offset ($\Delta z$) caused by pupil aberration while image aberration of the lens objective remains substantially unchanged.

* * * * *